May 5, 1959 C. E. ROESSLER, JR 2,885,198
LOAD RESPONSIVE TRANSMITTER
Filed April 3, 1957 3 Sheets-Sheet 1

INVENTOR
Charles E. Roessler, Jr.
BY
Frank H. Borden
ATTORNEY

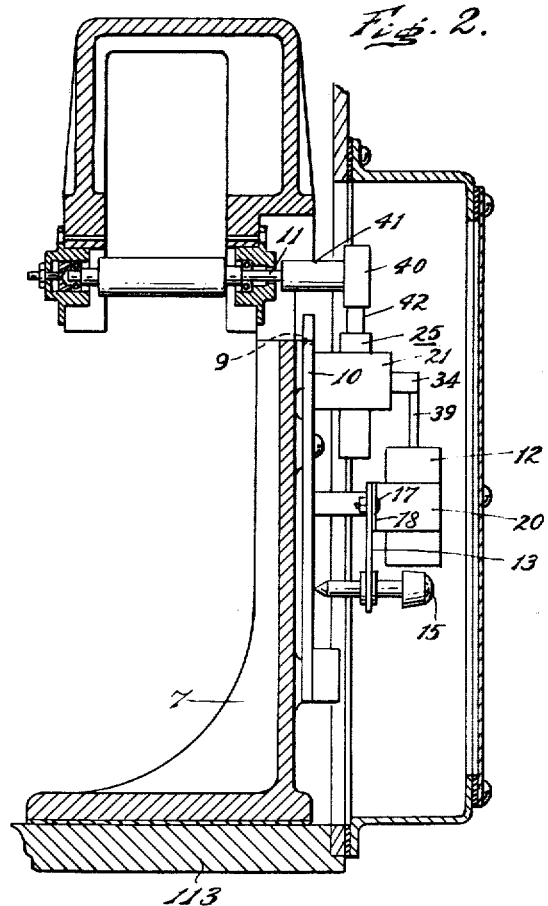

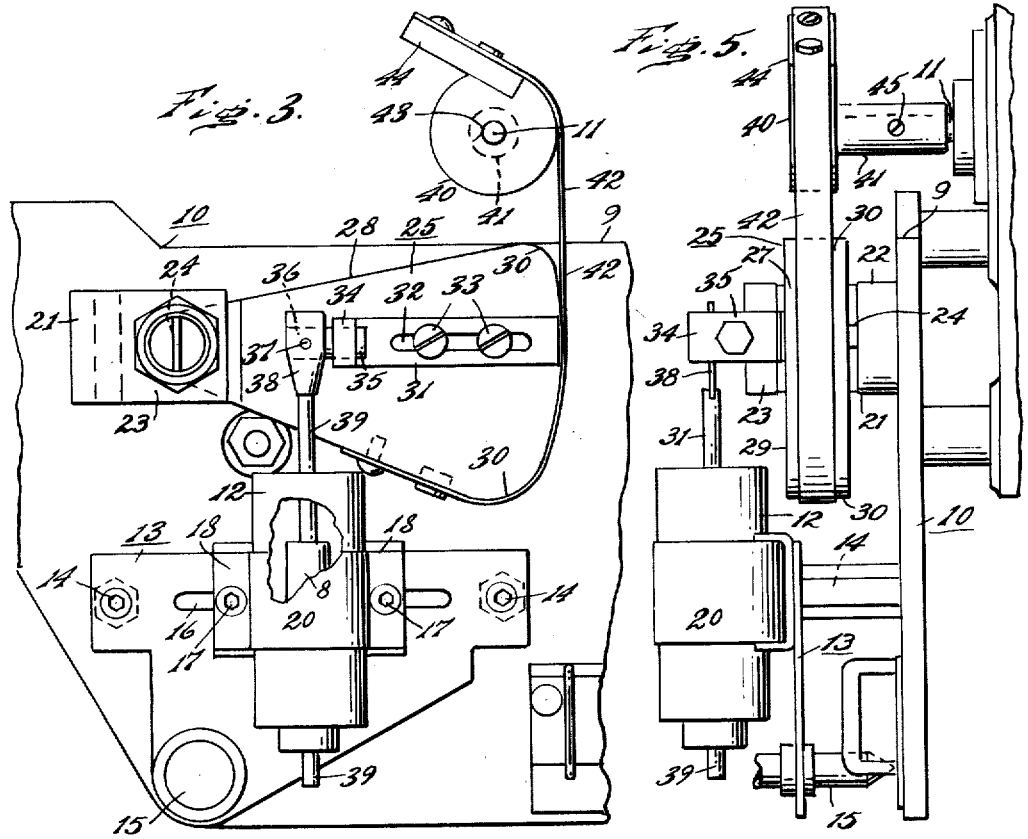
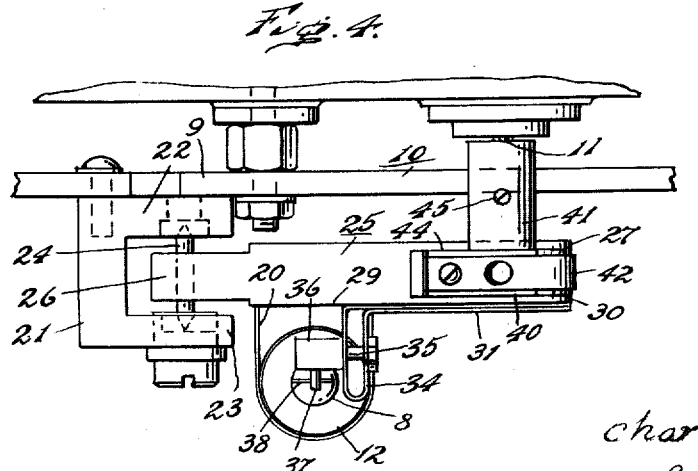

United States Patent Office 2,885,198
Patented May 5, 1959

2,885,198

LOAD RESPONSIVE TRANSMITTER

Charles E. Roessler, Jr., Rutland, Vt., assignor to The Howe Scale Company, Rutland, Vt., a corporation of Delaware Application April 3, 1957, Serial No. 650,469

6 Claims. (Cl. 265—61)

This invention relates to electric signal transmitters, and particularly to attachment units for operative association with visual indicators for weighing scales to produce an electric signal varying proportionally with variations in load applied to the weighing scale.

In an illustrative type of weighing apparatus, the weight force transmitting rod is operative on a shaft mounting a pendulum weight, moving same through a relatively small angle in the application of weight from zero to a scale maximum. While other signalling devices are usually associated with the scale in this type of mechanism, such as a visual projection of characters on a viewing screen, through associated mechanism, it is desired to provide a correlated electrical signal for remote indication, printing or control functions.

It is among the objects of the invention; to improve the scale art; to provide a transducer unit for attachment to or removal from existing scale organizations, for producing an electrical signal varying proportionally to weight applied on the scale platform or the like; to provide an electrical transducer responsive in varying output proportionally to angular motion of a transmitting element, without lag or backlash; to provide a transducer of the differential transformer type which is substantially linear in output in direct proportion to the angular motion of a shaft of a weighing scale; to provide an accurate substantially frictionless and lagless linear motion of the movable element of an electrical transducer as a function of angular motion of an oscillatable control shaft; to provide translating mechanism between a rotatable shaft and a linearly movable armature utilizing a flexible metal tape anchored to and about portions of the peripheries of two curved members; to provide a transmitter element for positioning an armature of a differential transducer including an actuating shaft mounting a disc, a pivoted lever to which such armature is pivotally secured, having a substantially arcuate end, with a tape engaged with and passing about the periphery of the disc and engaged with the lever and passing about the substantially arcuate end thereof, whereby with the external surfaces of both the disc and the arcuate end respectively generated about respective axes are substantially of uniform radius, the angular motion of the disc is transmitted as proportional angular motion of the lever and substantially proportional linear motion of the armature, departing from the truly proportional only by the sine angle error, which for most purposes is inconsequential, and which minute error can be compensated by a neutralizing error in a receiver, if used; to provide a transmitter for angular motion from an actuating shaft to a generally linearly movable armature-mounting rod, in which a flexible strap passes about a curved surface of a disc on the shaft and the curved surface of the end of a pivoted lever mounting the armature-mounting rod, in which one of the curved surfaces is non-linear and characterized, and the other is linear and uncharacterized, whereby the sine angle error of movement of the end of the armature mounting rod is nullified in transmission of the angular motion of the disc to the lever so that the motion of the armature-mounting rod is strictly proportional to the degrees of motion of said disc; and many additional objects and advantages will become more apparent as the description proceeds.

In the accompanying drawings, forming part of this description:

Fig. 1, represents a front elevation of an illustrative visual weight-indicating system, for association with a beam scale (not shown), partially broken away to show the salient features of the internal mechanism thereof including an oscillatable pendulum shaft, to one extended end of which the electrical signalling attachment unit of the invention is coupled for the production of an electrical signal proportional in amplitude to the angular positioning of said shaft with the attachment removed for clarity.

Fig. 2, represents a fragmentary vertical section through the housing of the visual weight-indicating system and through a portion of the latter, taken on line 2—2 of Fig. 1, with all operating parts removed for clarity except the pendulum shaft shown in elevation, said section also passing through the mounting-bracket of the electrical signalling attachment, with the latter shown in side elevation.

Fig. 3, represents a front elevation of the electrical transducer attachment of the invention, for mounting on an anchorable bracket.

Fig. 4, represents a fragmentary top plan of the organization of Fig. 3, with the upper shaft-mounted disc cut away to show the outer end of the lever below it.

Fig. 5 represents a fragmentary side elevation of the mounted organization shown in Fig. 3.

Figure 1:
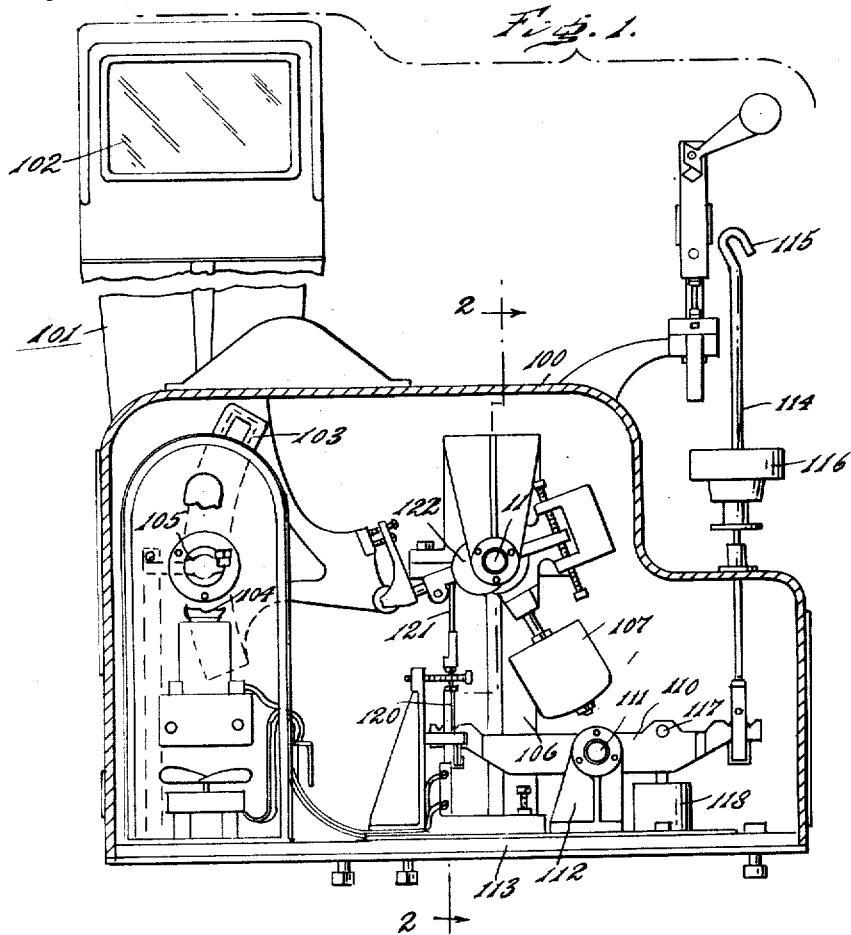

There are many situations in which it is desired to convert transmitter motion into electrical signals representative of the motion. Thus, for example of transducers for such purposes, movable element transformers, such as differential transformers having a relatively movable armature, emit phased signals of progressively changing amplitude proportionally to the movement of the armature from a given position. While the curve of the output in extreme relative movements of the armature is non-linear, that is, it is not proportional in amplitude to the change of relative armature position, there is a usable median portion of the output curve passing in both directions across null or zero output, which is linear, and it is this portion of the output which is preferred for signalling purposes. In general, in an illustrative case, however, this linear portion of the output curve is produced by very minute relative armature motions, say of the order of plus or minus .1". While such linear signals are useful of themselves, as means for locating or identifying the position of the movable element, for instance, it is frequently preferred to incorporate such transmitter transducer in a null-balance circuit including a receiver, comprising complemental movable element transformer means, an amplifier and a servo motor positioning the movable element of the receiver transducer. In the usual arrangement the servo is stationary when the outputs of the transmitter and receiver are at null-balance. When the condition of an associated variable changes, the movable element of the transmitter is shifted relative to its coils, producing an unbalancing signal in the circuit. This signal is amplified and actuates the servo to reposition the receiver transducer to cancel the transmitter signal. The running of the servo is a function of the change of condition of the variable and the servo may also be used to actuate indicators, recorders, printers, collateral controls or the like.

Transmitters of the foregoing type have become well established in the art where the motion to which the movable element is responsive is a generally straight line motion as, for instance, movements of the free end of a Bourdon tube to which the movable element is attached. Where the movable element of the condition-responsive transmitter element is rotatable, so that the motion is angular, and this angular motion is to be converted into generally straight line motion of the movable element of the transducer, difficulties are experienced. These are magnified by the relatively minute range of armature motion through which a linear output of the transducer is attained. It is important that the translating organization be as nearly frictionless as possible so as to minimize reaction on the rotatble shaft, and it is equally important that lag and back-lash be eliminated. These requirements are critical, as is the further essential that the motion of the armature be proportional to the rotation of the transmitter rotational element.

Referring to Fig. 1, a fragmentary front elevation of an automatic visual indication weighing unit is disclosed for association with a beam scale (not shown). Illustrative features of this unit are the housing 100, communicating with the periscope assembly 101, mounting the viewing screen 102, on which graduations are projected in enlarged form by a reflector system (not shown), from the initial projection thereof from an angularly movable light transmitting chart 103, by a light source 104 (shown broken away for simplicity), through an objective lens assembly 105 onto the reflector system.

The salient features of the unit include a standard 106, on which is journalled a pendulum shaft 11, mounting the pendulum 107 which is caused to rise or fall with rotations of shaft 11, until balance of the weight force applied to the beam scale (not shown) associated with the unit is attained. The application of the weight force to the pendulum shaft 11, through suitable well known mechanism, moves the chart 103 in angular motion between the light and the magnifying lens, and thereby produces the proper coordinated graduations on the viewing screen.

The mechanism for translating weighing scale motion into angular motion of the pendulum shaft and from the pendulum shaft to the chart is well known in the art. It includes a properly disposed tension member 121 for transmitting the load force to the shaft 11. Illustratively it comprises a rock or even lever 110, pivoted on a shaft 111, journalled in a bracket 112 anchored to the base 113 of the housing 100. One end of the rock even lever 110 is pivotally engaged by the inner end of the connecting rod 114, and the upper end of the latter has a hook 115, for engagement over and with the free end of a scale beam (not shown). The rod 114 may mount a counterpoise cup 116, in which varying weights of counterpoises may be disposed. The same free end of the rock even lever 110, pivotally mounts the outer end 117 of an oil or like dashpot assembly 118, for damping the motion of the mechanism. The other end of the rock even lever 110 pivotally engages a tape connection 120, engaging and exerting tension on a flexible tape or strap 121, the outer end of which passes about the outer periphery of a chart cam 122, to which it is secured. The chart cam 122 is mounted on, or actuated with, pendulum shaft 11, to rotate same while also positioning the chart 103 as a predetermined function of the load force applied to the lever 110. In general the entire motion of the pendulum shaft 11 in the application of the load force thereto from zero to its maximum is of the order of a very few degrees, usually comprising about 30° as a maximum.

It is desired to provide a simple electrical organization as an attachable and detachable unit, for assembly with such of the visual units as may be desired, for securing remote indications or records of the attained applied weight. The electrical signalling unit may be built into the visual indication unit with the construction of the latter or it may be supplied as a conversion unit for attachment to exisiting weight indicating units. To this end the electrical unit to be described is provided, for emitting an electrical signal, the amplitude of which is substantially porportional to the positioning of the chart, or relatedly to the positioning of the pendulum shaft 11 when suitably coupled to the latter. This signal may be used for actuating various sorts of indicators, such as meters, or the like, but usually it is preferred to buck its output against the output of a receiver positioned by a servo, through an amplifier in a null-balance circuit with the running of the servo positioning repeater charts, printers, recorders, controls or the like for remote indication of or reaction to the applied weight on the scale. Unbalance between the transmitter and receiver signals causes the servo to run to actuate the receiver to progressively reduce the unbalance of the circuit, until, with substantial rebalance thereof, the servo stops.

The transmitter unit, according to a preferred embodiment, comprises a main or base plate unit 10, formed for anchored attachment to a rigid bracket 7 for rigid mounting on the base plate 113, in general parallelism with the vertical axis of main bracket 106, with plate 10 perpendicular to the output end of pendulum shaft 11. The bracket plate 10 has an upper edge 9, below shaft 11, to permit the latter to project across the plane of plate 10. If desired, or necessary, shaft 11 is elongated, or fitted with an extension adapter, for this purpose.

The transducer, the output of which is to be controlled functionally with and by angular motion of shaft 11, may be of any sort that utilizes a relatively movable armature and coils. Illustratively and usually, preferably, it may comprise a differential transformer such as is described in the U.S. patent to William D. Macgeorge, #2,568,587, issued September 15, 1951, in one typical example of which the signal develops from null to a maximum amplitude in linear progression in response to relative progressive motion of the armature, of the order of .1″. Where it is desired to obtain a signal of enhanced amplitude, and other advantages, such as linear output over a longer range of armature relative movement, the signalling device may be constructed in accordance with the disclosure in the U.S. application of William D. Macgeorge on a Differential Transducer, Serial #620,941, filed November 7, 1956.

Assuming that the transducer is a differential transformer, it comprises a fixed coil section 12, comprising primary and secondary windings, and an armature 8, mounted for axial motion within the coil section 12.

The coil section 12, is adjustably clamped to relatively small resilient sub-plate 13, rigidly anchored, by means to be described, to the bracket plate 10 at its opposite upper ends, as by bolts 14—14, with the plate 13 in general vertical alignment with the front face of a lever to be described. Said sub-plate 13 is subject to flexure about a vertically rolling horizontal axis by the lower adjustable bearing pin 15 engaging and reacting from the bracket plate 10.

The sub-plate 13, is slotted, as at 16, to receive adjustable clamping screws 17—17, passing through wings 18—18 of a semi-round or U-shaped clamp 20. The clamp embraces and permits axial adjustment of the coil section 12, while holding the section 12 rigid and against axial motion when the screws, 17—17, are tightened. It will be seen that the coil section 12 is adjustable in three directions, namely axial of the coil, in clamp 20 transversely of the coil in one plane by the screws 17—17 and slot 16, and generally pivotally in a plane transverse of the coil and normal to the line of the slot 16, by adjustment of the bearing pin 15. These three adjustments are used to align the coil section with the line of movement of the coil-enclosed armature 8.

A U-shaped rigid bracket 21 is fastened by one leg 22 to the main bracket plate 10, with its median axis parallel thereto, and the legs 22 and 23 thereof mount opposing bearings, to journal a tapered lever pivot pin 24. A generally triangular lever 25 is secured to the pivot pin 24, at the general apex 26 of the lever 25 so that the center of gravity of the lever is spaced from the pin 24, whereby the lever 25 is gravitationally biased downward about the pivot. The base area of the triangular lever opposite to the apex 26 is formed with a curved surface 27, which may be on an arc generated about the axis of the pivot pin 24, forming an arcuate surface 27 merging into the respective upper and lower side edges 28—28 of the lever by curved surfaces 30—30, to relieve the flexing of the tape.

The lever 25, on its front face 29, mounts a bracket 31, having a slot 32 and by means of studs 33—33 passing through the slot in parallelism with the axis of pivot pin 24, so that the bracket 31 is adjustable in position radially of the pivot pin 24 of the lever. Bracket 31 has a forwardly projecting foot 34, through which a pin 35 projects parallel to the front face 29, and the pin is anchored by a suitable sleeve or the like 36. An armature rod 39, guided in and relative to the coil section 12, is pivotally connected to the sleeve 36 at 37 by a terminal fin 38. The rod 39 mounts the armature 8, and the latter is preferably the only element in the unitary assembly made of magnetic material. After the coil section has been properly positioned on and by its support on the sub plate 13 the armature-mounting rod 39 is adjusted relative to the lever 25 so that the armature is substantially concentric with and in the coil section 12 and, with small lever movements moves axially of the coil section. Any necessary final adjustments can be effected after assembly with the visual unit in housing 100. A disc 40 is provided, having a hub 41. A flexible metallic tape 42 is anchored to disc 40 by tangentially extending anchor block 44 at one end. The other end of the tape 42 passes about curved surface 27 and the lower curved surface 30 to anchorage on the lower surface of lever 25.

In assembling the two units, the bracket plate 10, by means of bracket 7, is rigidly anchored to the base plate 113 of the visual unit, with the pivot pin 24 in parallelism with the axis of the pendulum shaft 11. It is assumed at this point that there is no load on the scale, and the shaft 11 is at its zero setting. The hub 41 of the disc 40 is slid over the shaft 11, and turned thereon until the slack in the tape 42 has been taken up and the lever has been moved to a mid-point at which the armature 8 is substantially centered axially of the coil section so that the output of the transducer is substantially null, according with the instantaneous zero setting of the associated scale. The hub 41 is then anchored to the shaft 11 by suitable means, such as the set screw 45. If for any reason it is desired to have the null output from the transducer accord with mid-scale reading, or with maximum scale reading, more or less of the tape is wound on the disc 40 to secure the desired lever attitude. It is generally preferred to have the output signal from the transducer progress uniformly from null at zero and attain its maximum amplitude at the maximum scale reading.

In assembly the disc 40 is above the lever 25, and its peripheral edge and the curved end 27 of the lever are both substantially tangential to a common vertical plane, so that the strap or tape 42 has a substantially vertical course between the disc and lever, which is held taut without slack by reason of the gravity bias of the lever 25. This preferred setting with no electrical signal at zero weight coincides with the positioning of the chart 103 to project the zero graduation on the viewing screen with no weight on the scale. With counter-clockwise motion of the shaft 11, in Fig. 3, in response to applied load force on connecting rod 114, with rise of the pendulum, the disc winds on a part of the tape 42, raising the lever 25 against its relatively small gravity bias, while keeping the tape taut, to displace the armature 8 relatively to the coil section 12 to induce voltage of progressively increasing amplitude and of one phase, substantially proportional to the angular motion of the disc 40, and without lag or backlash. When the weight is removed the visual chart and the electrical signal return to zero.

It will be understood that the disc and lever are of substantially the same axial thickness and that a substantially median plane perpendicular both to the pendulum shaft 11 and the pivot pin 24 substantially bisects the disc 40, the lever 25 and the tape 42.

It will be seen that in all relative positions of the disc 40 and the lever 25, the tape 42 is tangential to both and is substantially vertical. It will be understand, of course, that so long as a substantially vertical plane is commonly tangential to the disc and to the curved end of the lever, it makes no difference on which side of such plane either thereof may be located or whether the respective ends of the vertical portion of the tape merge into the respective peripheries in the same or in opposite directions.

It will be understood that for general purposes the periphery of the disc 40 and of the curved end 27 of the lever 25 are both linear, being true arcs of circles, so that an angular motion of the disc 40 through X° is followed up proportionately by movement of lever 25 through X°. Due to the disposition of the axis 37 of the armature-mounting rod 39, in displaced relation to the axis 24 of the lever 25, the upper end of the armature rod moves generally vertically in a small arc, detracting from the truly proportional axial motion of the armature in response to the proportional movements of disc 40 and lever 25. This sine angle error is infinitesimal, especially in the small range of movements of the armature rod, and in the usual case can be ignored. Where this error may be considered as material in the accuracy of the circuitry using a receiver in a null balance circuit, the cam driven by the servo for moving the receiver armature may be so characterized as to nullify the error. On the other hand, if exact proportional accuracy in the transmitter signal is desired, either the periphery of the disc 40 or the rounded end 27 of the lever 25 are characterized out of the linear, to compensate for and to nullify said sine angle error. Preferably, the disc 40 is formed as a non-linear cam element, sufficiently characterized as to produce with the uncharacterized lever end surface 27, a lever motion which is just non-linear enough to cancel the sine angle error in the armature motion, making the latter truly proportional to the angular movement of the disc 40. The characterization of the disc 40 is so slight that it would be undiscernibly different from a true arc, so that the periphery of disc 40 can be considered as characterized as disclosed.

It will be seen that the electrical signal emanating from the electrical organization, in the preferred form, is directly proportional in amplitude from no or a null signal at zero through maximum amplitude at the maximum for the scale. The unit is small, is quickly attachable and detachable from the visual unit, is highly accurate, and can exactly accord in output with the range of displayed graduations in the chart 103.

I claim as my invention:

1. In weighing, an oscillatable shaft, means for angularly adjusting said shaft as a function of an applied load force, a differential transducer having a relatively movable armature, and means for moving said armature substantially proportionally to the movements of said shaft, whereby the transducer produces an electrical signal proportionally variable in amplitude with movements of said shaft, in which said means comprises a rounded disc on said shaft, a lever pivoted asymmetrically on an axis parallel to said shaft and having a rounded end, a flexible strap secured to said disc and to said lever and passing about the respective rounded disc and said rounded end substantially tangential to both, whereby the weight of the lever maintains tautness of said strap between said disc and said lever, and means coupling said movable armature to said lever for movement therewith.

2. An electrical signalling transmitter unit for weighing scales including a shaft angularly oscillatable under applied weight, comprising a bracket plate, a lever pivoted to the plate and having a rounded end edge spaced from the pivot thereof, a flexible strap anchored at one end to the lever, a disc having a rounded edge surface, the other end of said strap anchored to the disc, an electrical transducer comprising a coil section and a relatively movable armature section, means for anchoring one of said sections to the plate, means for pivotally connecting the other of said sections to said lever, and means for securing said disc to such shaft, whereby angular motion of said disc is transmitted through said strap to said lever and from the lever to the transducer section attached to said lever with linear motion of said latter substantially proportional to the angular motion of said disc.

3. An electrical signal unit for mechanism including an output shaft oscillatably positionable proportionally to variations in an associated independent variable, comprising a support plate, a lever pivoted to the plate and having a rounded edge surface spaced from the pivot, a rounded disc, means for mounting said disc on said shaft, a flexible tape connected to the lever and disc whereby when the disc is mounted on such shaft the tape passes about part at least of the surface of the disc and said edge of said lever to transmit angular motion from such shaft proportionally to said lever, a differential transducer comprising a hollow coil section and an armature disposed in the coil section, means mounting the coil section in fixed relation to said plate, means pivotally mounting the armature on said lever for movement therewith relative to said coil section.

4. A unit as in claim 3, in which means are provided for adjustably positioning said coil section in three dimensions to align it properly with the path of movement of said armature.

5. A unit as in claim 4, and means for adjusting the pivotal mounting of said armature radially of the pivotal axis of said lever.

6. A unit as in claim 3, and means for adjusting the pivotal mounting of said armature on a line radial of the axis of said lever.

References Cited in the file of this patent

UNITED STATES PATENTS

| 2,394,820 | Syrcher et al. | Feb. 12, 1946 |
| 2,610,052 | Macgeorge | Sept. 9, 1952 |
| 2,801,874 | Macgeorge | Aug. 6, 1957 |

FOREIGN PATENTS

| 221,839 | Great Britain | Apr. 12, 1923 |